No. 857,686. PATENTED JUNE 25, 1907.
R. THAYER.
ELECTRICALLY PROPELLED VEHICLE.
APPLICATION FILED APR. 4, 1907.
3 SHEETS—SHEET 1.
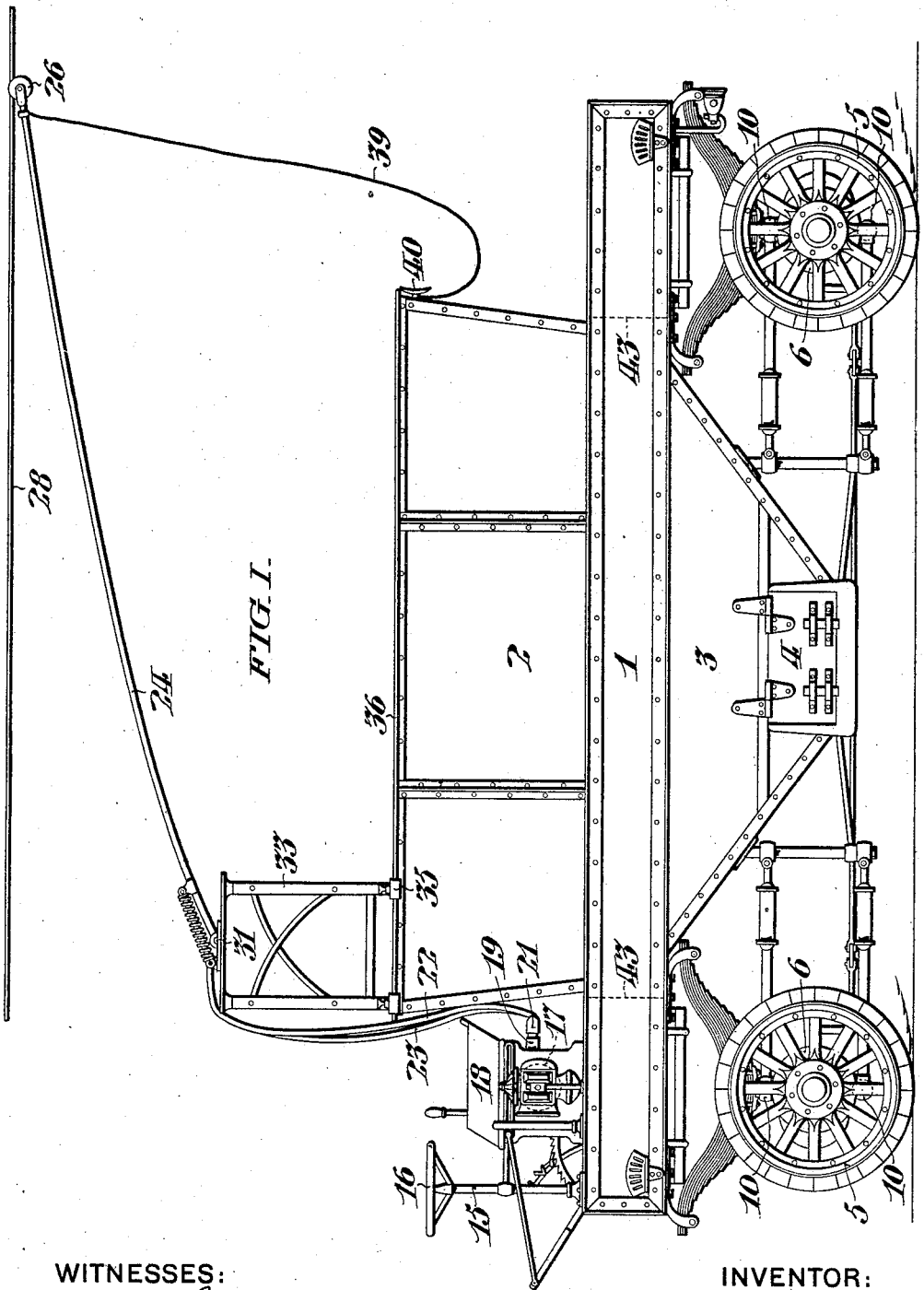
WITNESSES:
Clifton C. Hallowell
Thomas H. Kerr
INVENTOR:
RUSSELL THAYER,
by Arthur E. Paige
Atty.

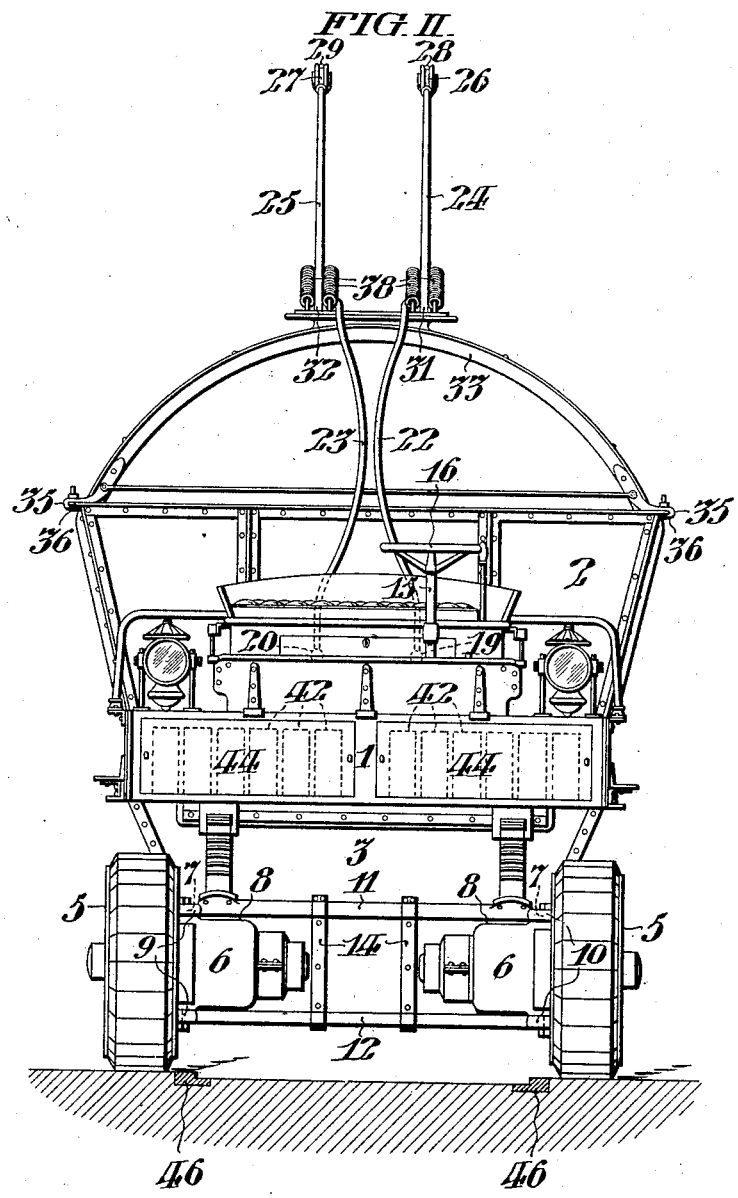

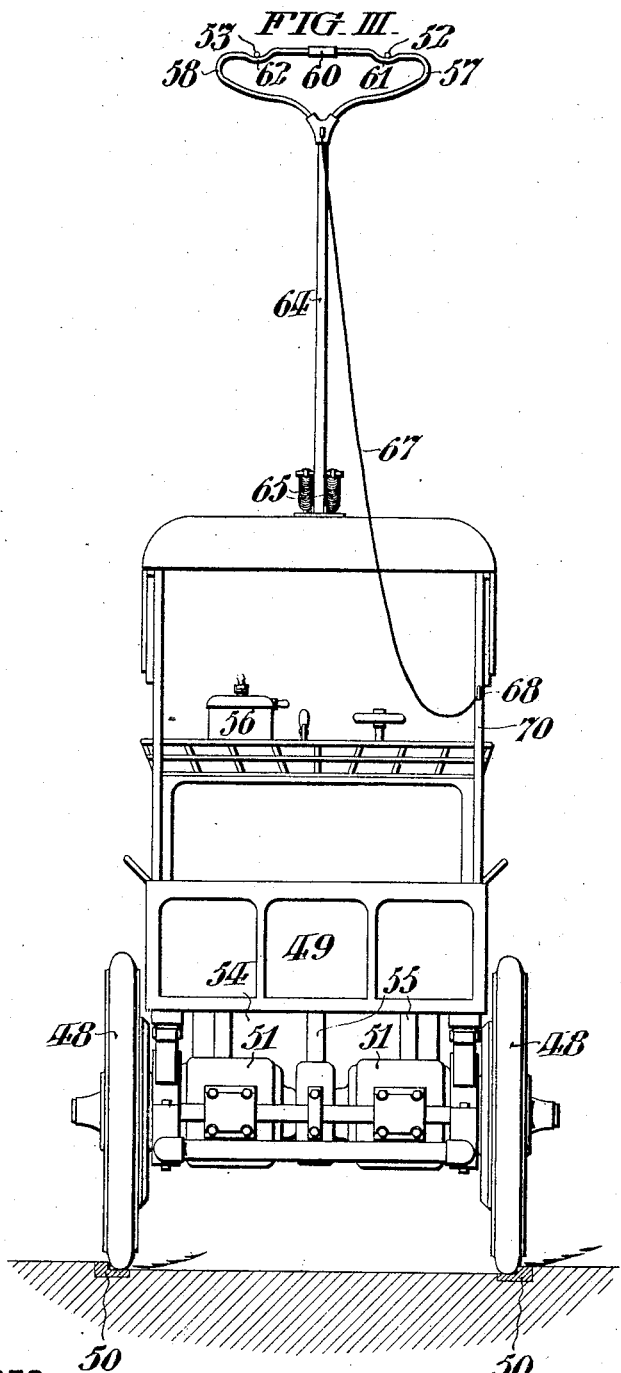

UNITED STATES PATENT OFFICE.

RUSSELL THAYER, OF PHILADELPHIA, PENNSYLVANIA.

ELECTRICALLY-PROPELLED VEHICLE.

No. 857,686.   Specification of Letters Patent.   Patented June 25, 1907.

Application filed April 4, 1907. Serial No. 366,434.

*To all whom it may concern:*

Be it known that I, RUSSELL THAYER, of Philadelphia, in the State of Pennsylvania, have invented a certain new and useful Improvement in Electrically-Propelled Vehicles, whereof the following is a specification, reference being had to the accompanying drawings.

My improvement relates to a vehicle of the class described in Letters Patent of the United States #12,449, reissued February 6, 1906, and #838,283, dated December 11, 1906, viz: a vehicle which derives its motor current alternately from an external supply system and from a storage battery carried by the vehicle.

My invention provides a vehicle of the peculiar class specified, constructed and arranged to coöperate with a railway supply system, which is insulated from the ground and includes parallel overhead positive and negative conductors.

As hereinafter described, my invention comprises an automobile provided with an electric motor and a storage battery; having wheels constructed and arranged to traverse either the tracks or adjacent road bed of a railway supply system, with said motor insulated from the tracks while in operative connection with said two overhead conductors, and, to traverse a trackless road bed, independently of said system, with said motor in operative connection with said battery.

My invention includes the various novel features of construction and arrangement hereinafter more definitely specified.

In the accompanying drawings, Figure I, is a side elevation of a vehicle conveniently embodying my invention. Fig. II, is a front end elevation of the vehicle shown in Fig. I. Fig. III, is a rear end elevation of a vehicle embodying a modified form of my invention.

Referring to Figs. I, and II; the vehicle comprises the frame 1, supporting the body 2, which is open at the top, and has the hopper shaped bottom 3, provided with dumping doors 4, which exist upon opposite sides of said hopper; only one, however, being shown in Fig. I. Said vehicle is provided with four supporting wheels 5, each having an individual motor 6, and each wheel and its motor may be turned in a horizontal plane upon vertically disposed trunnions 7, which are in rigid relation with the respective motor casings 8. Said trunnions 7, are supported in bearings 9, and 10, at the respectively opposite ends of the bars 11, and 12; which bars are rigidly connected by the vertical braces 14, to form axle frames at the respectively opposite ends of the vehicle. Said wheels 5, are coupled in operative connection with a vehicle steering shaft 15, provided with the hand wheel 16, so that said wheels 5, are dirigible by said wheel 16, to determine the direction of progression of the vehicle. Said motors 6, may be electrically connected either in series or in parallel relation with each other, by means of the controller 17, which is conveniently located beneath the chauffeur's seat 18, and which is provided with sockets 19, and 20, arranged to receive the plugs 21, of the respective flexible electrical conductors 22, and 23, which are carried by the poles 24, and 25, to their respective trolleys 26, and 27, arranged for electrical connection with the respective overhead conductors 28, and 29. Said poles 24, and 25, are pivoted at 31, and 32, on the bridge 33, having the bearings 35, which are slidable longitudinally with respect to the vehicle on the flanges 36, at the opposite edges of said vehicle body 2; said bridge being thus arranged to be readily shifted to facilitate the loading of the vehicle. Said poles 24, and 25, are connected with said bridge 33, by the spring couplings 38, which tend to normally uplift said poles for engagement with said conductors 28, and 29. However, as shown in the drawings said poles may be maintained in lowered position by their respective ropes 39, which are detachably secured at their lower ends to the cleats 40, on the vehicle body 2.

When it is desired to electrically disconnect the vehicle from the external supply system, both of the poles 24, and 25, are withdrawn from said conductors 28, and 29, and, switch mechanism adjunctive to the controller 17, changes the connections from the external supply circuit to the internal supply circuit so as to include the storage batteries 42, in operative connection with said motors. Said batteries are conveniently located in the receptacles 43, which are provided with doors 44, at the opposite ends of the vehicle, so that said batteries are readily accessible.

It is to be noted that as shown in Figs. I, and II, the vehicle supporting wheels 5, are axially farther apart than the tracks 46, and consequently said vehicle is supported independently of said tracks, even when traveling concentrically therewith. However, in the form of my invention shown in Fig. III, the vehicle wheels 48, supporting the vehicle body 49, are arranged to traverse the tracks 50, when the motors 51, are in electrical connection with the overhead supply system consisting of the two conductors 52, and 53; but said wheels 48, are arranged to digress from and travel independently of said tracks 50, when being propelled by the storage battery 54, which is conveniently supported beneath the vehicle body 49, by the hangers 55.

The motors 51, alternately receive their current from the storage battery 54, and from the overhead supply system with which they are connected through the controller 56, by the contact devices comprising the opposed loops 57, and 58, connected in axial alinement by the insulating coupling 60. Said loops comprise the bights 61, and 62, respectively local to the conductors 52, and 53, and arranged for sliding contact therewith. Said loops 57, and 58, are carried at the upper end of the single pole 64, which is normally raised into contact with said conductors by the springs 65, but arranged to be withdrawn from said conductors by the rope 67, connected with the cleats 68, on the standard 70, supporting the roof of the vehicle.

I do not desire to limit myself to the precise details of construction and arrangement herein set forth, as various modifications may be made therein without departing from the essential features of my invention, as defined in the claims.

I claim:—

1. In an electrically propelled vehicle which derives its motor current alternately from an external supply system and from a storage battery carried by the vehicle, constructed and arranged to coöperate with a railway system which includes two overhead electrical conductors and parallel subjacent tracks insulated from said conductors; a motor; means maintaining said motor insulated from said tracks; means arranged to removably connect said motor electrically with said overhead conductors; a storage battery; and, means arranged to removably connect said motor electrically with said storage battery, substantially as set forth.

2. In an electrically propelled vehicle which derives its motor current alternately from an external supply system and from a storage battery carried by the vehicle, constructed and arranged to coöperate with a railway system which includes two overhead electrical conductors and parallel subjacent tracks insulated from said conductors; a motor; means maintaining said motor insulated from said tracks; means, comprising means pivoted on the vehicle, arranged to removably connect said motor electrically with said overhead conductors; a storage battery; and, means arranged to removably connect said motor electrically with said storage battery, substantially as set forth.

3. In an electrically propelled vehicle which derives its motor current alternately from an external supply system and from a storage battery carried by the vehicle, constructed and arranged to coöperate with a railway system which includes two overhead electrical conductors and parallel subjacent tracks insulated from said conductors; a motor; means maintaining said motor insulated from said tracks; means, comprising two poles independently pivoted and relatively movable on the vehicle, arranged to removably connect said motor electrically with said overhead conductors; a storage battery; and, means arranged to removably connect said motor electrically with said storage battery, substantially as set forth.

4. In an electrically propelled vehicle which derives its motor current alternately from an external supply system and from a storage battery carried by the vehicle, constructed and arranged to coöperate with a railway system which includes two overhead electrical conductors and parallel subjacent tracks insulated from said conductors; a motor; means maintaining said motor insulated from said tracks; means arranged to removably connect said motor electrically with said overhead conductors; a storage battery; means arranged to removably connect said motor electrically with said storage battery; and wheels arranged to support said vehicle independently of said tracks while said motor is in electrical connection with said external supply system, substantially as set forth.

5. In an electrically propelled vehicle which derives its motor current alternately from an external supply system and from a storage battery carried by the vehicle, constructed and arranged to coöperate with a railway system which includes two overhead electrical conductors and parallel subjacent tracks insulated from said conductors; a motor; means maintaining said motor insulated from said tracks; means, comprising means pivoted on the vehicle, arranged to removably connect said motor electrically with said overhead conductors; a storage battery; means arranged to removably connect said motor electrically with said storage battery; and wheels arranged to support said vehicle independently of said tracks while said motor is in electrical connection with said external supply system, substantially as set forth.

6. In an electrically propelled vehicle, which derives its motor current alternately from an external supply system and from a storage battery carried by the vehicle, constructed and arranged to coöperate with a railway system which includes two overhead electrical conductors and parallel subjacent tracks insulated from said conductors; a motor; means maintaining said motor insulated from said tracks; means, comprising two poles independently pivoted and relatively movable on the vehicle, arranged to removably connect said motor electrically with said overhead conductors; a storage battery; means arranged to removably connect said motor electrically with said storage battery; and wheels arranged to support said vehicle independently of said tracks while said motor is in electrical connection with said external supply system, substantially as set forth.

In testimony whereof, I have hereunto signed my name at Philadelphia, Pennsylvania this twenty third day of March 1907.

RUSSELL THAYER.

Witnesses:
 AMBROSE F. FOW,
 JOSEPH R. GEORGE.